United States Patent
Knepper et al.

(10) Patent No.: US 7,478,187 B2
(45) Date of Patent: Jan. 13, 2009

(54) SYSTEM AND METHOD FOR INFORMATION HANDLING SYSTEM HOT INSERTION OF EXTERNAL GRAPHICS

(75) Inventors: Lawrence E. Knepper, Austin, TX (US); Thomas A. Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 11/391,161

(22) Filed: Mar. 28, 2006

(65) Prior Publication Data

US 2007/0239913 A1    Oct. 11, 2007

(51) Int. Cl.
G06F 13/00 (2006.01)
G06F 3/00 (2006.01)
H05K 7/10 (2006.01)
G09G 5/00 (2006.01)

(52) U.S. Cl. .................. 710/300; 345/1.1; 345/2.1; 710/15; 710/17; 710/302

(58) Field of Classification Search .......... 710/300, 710/15, 17, 302; 709/203; 713/300; 725/134; 345/1.1, 2.1, 3.1, 156, 211, 502, 544; 386/116
See application file for complete search history.

(56) References Cited

U.S. PATENT DOCUMENTS

| | | | |
|---|---|---|---|
| 6,134,615 A | 10/2000 | Chari et al. | 710/103 |
| 6,418,492 B1 | 7/2002 | Papa et al. | 710/103 |
| 6,421,755 B1 | 7/2002 | Rao | 710/302 |
| 6,487,623 B1 | 11/2002 | Emerson et al. | 710/302 |
| 6,711,645 B1 | 3/2004 | Chari et al. | 710/302 |
| 6,970,173 B2* | 11/2005 | Ciolac | 345/544 |
| 7,123,212 B2* | 10/2006 | Acharya et al. | 345/2.1 |
| 2002/0150393 A1* | 10/2002 | Yamada et al. | 386/116 |
| 2002/0190920 A1* | 12/2002 | Kung | 345/3.1 |
| 2003/0179154 A1* | 9/2003 | Demsky et al. | 345/1.1 |
| 2004/0212610 A1* | 10/2004 | Hamlin | 345/211 |
| 2005/0091311 A1* | 4/2005 | Lund et al. | 709/203 |
| 2006/0109240 A1* | 5/2006 | Fu et al. | 345/156 |
| 2006/0119603 A1* | 6/2006 | Chen et al. | 345/502 |
| 2006/0212731 A1* | 9/2006 | Han et al. | 713/300 |
| 2006/0277587 A1* | 12/2006 | Lee | 725/134 |

OTHER PUBLICATIONS

"prefer". The American Heritage Dictionary of the English Language. Fourth Edition. 2000. Houghton Mifflin Company. Retrieved from Internet May 7, 2008. <http://www.bartleby.com/61/97/P0519700.html>.*

* cited by examiner

*Primary Examiner*—Mark Rinehart
*Assistant Examiner*—Thomas J. Cleary
(74) *Attorney, Agent, or Firm*—Hamilton & Terrile, LLP; Robert W. Holland

(57) ABSTRACT

Hot connection and disconnection of an external graphics cable with an information handling system provides automatic selection of an external graphics device or an internal graphics device for presentation of visual information. A graphics state module periodically stores visual information, such as display objects for recreating a display frame, and monitors an external graphics device port, such as a PCI Express port, to detect a change in connection state at the external graphics port. Upon detection of a connection or disconnection at the external graphics port, the graphics state module attempts to initiate graphics devices in a predetermined order and provides the stored visual information for presentation at successfully initiated graphics devices according to the predetermined order.

16 Claims, 2 Drawing Sheets

SYSTEM AND METHOD FOR INFORMATION HANDLING SYSTEM HOT INSERTION OF EXTERNAL GRAPHICS

BACKGROUND OF THE INVENTION

1. Field of the Invention

The present invention relates in general to the field of information handling graphics systems, and more particularly to a system and method for information handling system hot insertion of external graphics.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at an external or internal display. Generally, a graphics subsystem renders visual information provided by an application running on a CPU. The graphics subsystem typically resides in a chipset or a separate graphics card of the information handling system. Complex graphics presentation usually is processed at least in part by a graphics processor unit (GPU) so that the processing workload for presenting visual images is shifted from the CPU. For instance, the CPU generates and sends graphics instructions through a PCI Express (PCIe) bus to the GPU, which executes the instructions for presenting the visual image. In desktop information handling systems, the output from the GPU proceeds through an external cable, such as a VGA or DVI cable to an external display. Portable information handling systems send the GPU output through an internal bus to an integrated display, but also often support presentation of visual information at external display devices.

Graphics subsystems have become increasingly powerful, especially for presentation of complex graphics, such as 3D images and animation. In some instances, the power consumed and heat produced by a graphics subsystem make it difficult to integrate the graphics subsystem within an information handling system housing. One alternative is to put the graphics subsystem in an external graphics box that has power and cooling independent from the information handling system. For example, a PCIe external port of an information handling system communicates visual information through an external cable to the external graphics box, which renders the visual information for presentation as a visual image at a display. The PCI Express specification calls for a "hot plug" capability that allows hot insertion and removal of a PCIe cable while an information handling system is running. However, current hardware platforms and operating systems will not support hot plug capability of core devices, such as a graphics subsystem, so an attempt to hot plug an external graphics box will generally crash the system. This presents a particular challenge with portable information handling systems where end users expect hot plug capability as part of the system usage model for all external ports, including external displays and docking systems. The end user experience will be negatively impacted by delays and complexity in the process of restarting an information handling system and setting up the external graphics box each time it is used.

SUMMARY OF THE INVENTION

Therefore a need has arisen for a system and method which supports hot insertion and removal of an external device with an information handling system external graphics port.

In accordance with the present invention, a system and method are provided which substantially reduce the disadvantages and problems associated with previous methods and systems for hot insertion and removal of an external device with an information handling system external graphics port. Video information presented at an active graphics device is periodically stored. A change in connection state at the external graphics port results in attempts to initialize graphics devices in a predetermined order. Upon successful initiation of a graphics device, stored video information is provided to that graphics device for presentation.

More specifically, an information handling system generates visual information for presentation at a display. The visual information is communicated over a PCI Express bus to an internal graphics subsystem which formats the visual information to form visual images on the display. The PCI Express bus also interfaces with an external connector graphics port managed by a graphics state module having a poller, a graphics state memory and a graphics preference module. The poller periodically polls the external graphics port to detect a change in status at the port, such as the connection or disconnection of a cable at the port. The graphics state memory periodically stores the visual information, such as displays objects that will reconstruct every fifteenth display frame presented by the currently active graphics device, like the internal graphics subsystem or an external graphics box interfaced with the external graphics port. Upon detection by the poller of a change in connection state at the external graphics port, the graphics preference module attempts to initialize graphics devices in a predetermined order, such as with a preference to use the external graphics box over the internal graphics subsystem if the external graphics box is available. Once a graphics device is initialized, the visual information stored in the graphics state memory is provided for presentation by the initialized graphics device.

The present invention provides a number of important technical advantages. One example of an important technical advantage is that an information handling system manages hot plugging of a graphics subsystem in a robust and well behaved manner for a positive end user experience. Connecting or removing an external graphics box and an information handling system external PCIe port automatically presents visual information at a preferred display based on user preference settings. Temporarily storing the current display image ensures a smooth transition of the visual information presentation from an active graphics device, such as an integrated display, to a preferred graphics device, such as an external graphics box.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An external graphics box connects and disconnects with an operating information handling system so that visual information is automatically provided at the external graphics box when connected and at an internal graphics system when disconnected. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
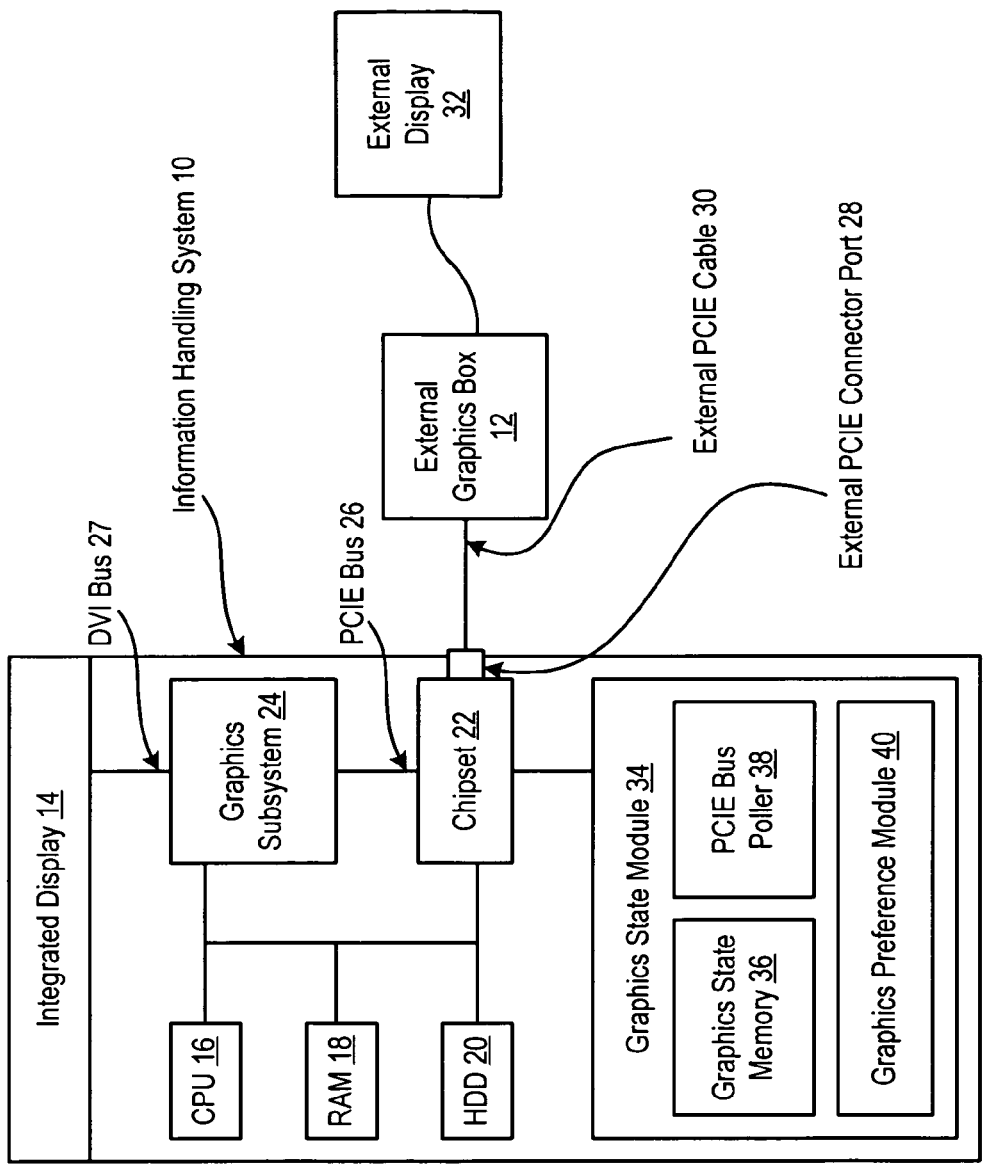
FIG. 1 depicts a block diagram of a portable information handling system configured to support hot insertion and removal of an external graphics device.

Referring now to FIG. 1, a block diagram depicts a portable information handling system 10 configured to support hot insertion and removal of an external graphics device, such as an external graphics box 12. Portable information handling system 10 has an integrated display 14, such as an LCD, that presents visual information generated by a CPU 16 running in coordination with RAM 18, a hard disk drive 20 and chipset 22. Visual information is communicated to a graphics subsystem 24 through a PCIe bus 26, such as with display objects that are processed at the graphics subsystem. The graphics subsystem processes the display objects to produce pixel values for communication to display 14 through a DVI bus 27, with the pixels generating a visual image according to the visual information. Chipset 22 also interfaces with an external PCIe connector 28 that communicates the visual information through an external PCIe cable 30 to an external graphics box 12. External graphics box 12 processes the display objects to provide pixel values for presentation at an external display 32.

In order to manage hot connections and disconnections of external graphics box 12 to port 28, a graphics state module 34 preserves visual information presented at an active graphics device with dedicated hardware and periodically polls to detect a change in the connection state at port 28. A graphics state memory 36 is a hardware display cache memory device that periodically has display objects written to it that allow the reconstruction of the a presented display frame. For instance, in one embodiment, graphics state memory 36 has a memory controller with 128 MB of physical memory and interfaces with PCIe bus 26 to preserve the display object state associated with every fifteenth display frame. The interval at which display frames are saved is programmable to allow for performance adjustments dynamically depending on the time required to render the frame but subject to time limitation, such as saving a display frame at least every two seconds. A PCIe bus poller 38 periodically polls PCIe bus 26 to determine if a change in state has occurred to a graphics device connection at port 28, such as if a connected external device is disconnected or a disconnected external device is connected. If no change in the connection state occurs at port 28, the visual information continues to the active graphics device.

If a change occurs in the connection state at external PCIe connector port 28, such as the insertion or removal of cable 30 to interface external graphics box 12, a graphics preference module 40 determines a preferred active graphics device and transitions the presentation of the visual information through that graphics device. Graphics preference device 40 first writes the visual information from graphics state memory 36 to hard disk drive 20 to preserve display state and object information in non-volatile form. Graphics preference device then initiates an operating system NMI event and enters an NMI handler routine until a graphics device is initialized. For instance, the NMI handler enters a loop to attempt to bring up graphics devices in a hierarchal order until a graphics device is found present in the PCIe fabric bus walk. In one embodiment, external graphics box 12 is given preference over internal graphics subsystem 24. When a graphics device is enabled, the NMI handler verifies the contents of graphics state memory 36 by comparison with the visual information saved on hard disk drive 20 and the visual information is regenerated by the enabled graphics device. In addition a confirmation dialog is presented to receive a user input that the correct graphics device is enabled. If the user enters no or fails to respond in a predetermined time period, the NMI handler attempts to enable a different graphics device.

Figure 2:
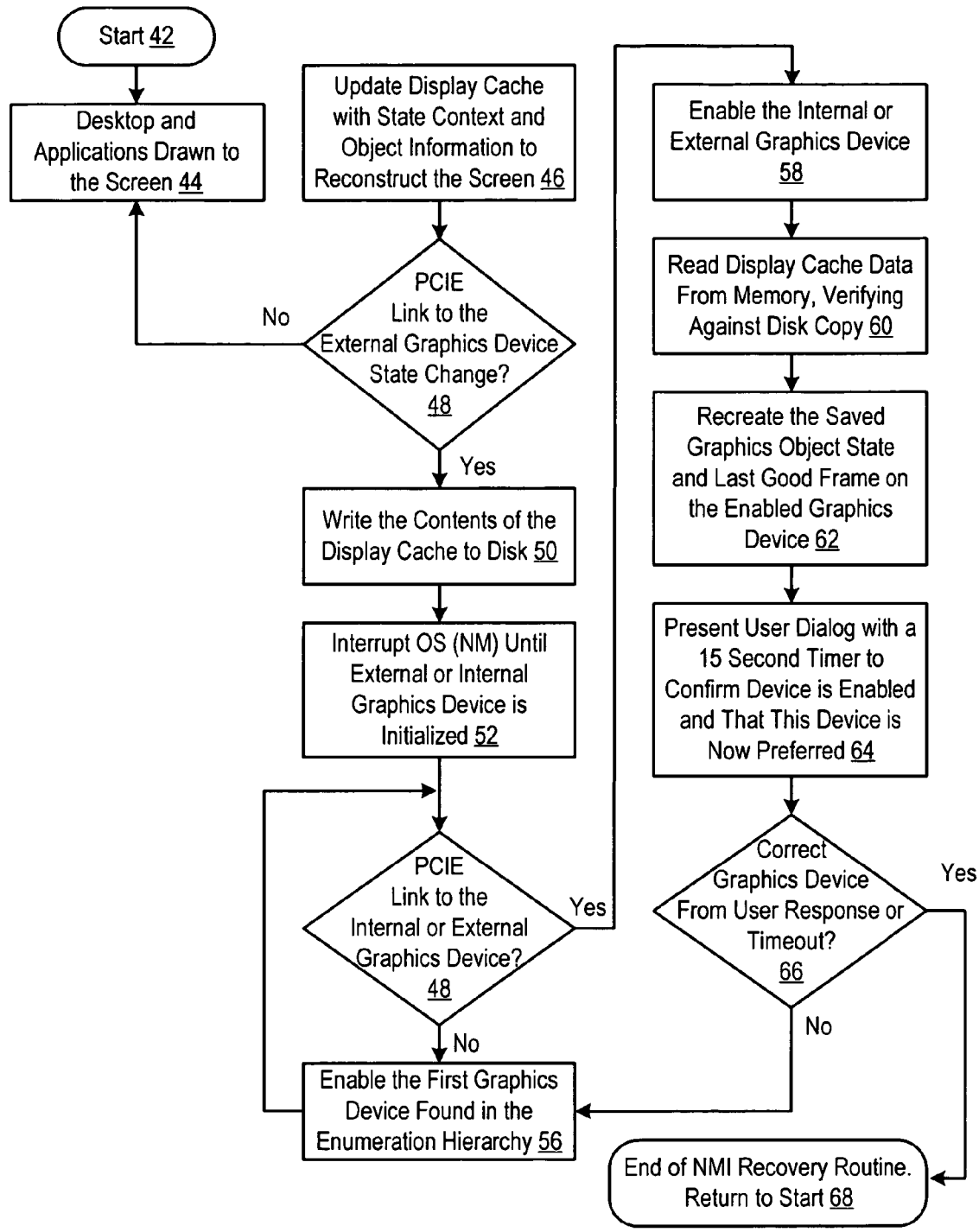
FIG. 2 depicts a flow diagram of a process for managing hot insertion and removal of an external graphics device with a portable information handling system.

Referring now to FIG. 2, a flow diagram depicts a process for managing hot insertion and removal of an external graphics device with a portable information handling system. The process starts at step 42 and, at step 44, the desktop plus applications visual information is drawn to the display screen. At step 46, the graphics state memory display cache is updated with state, context and object information to reconstruct the active display screen. At step 48 a determination is made of whether the PCIe link to the external graphics device has a state change. If not, the process returns to step 44 to continue updating the graphics state memory with active display visual information. If a state change is detected the process continues to step 50 to write the contents of display cache to the hard disk drive. At step 52, an NMI interrupts the operating system until an external or internal graphics device is initialized. At step 54 a determination is made of whether a PCIe link exists to internal or external graphics devices and, if not, the process continues to step 56 to enable the first graphics device found in the predetermined hierarchal order. If a PCIe link is present at step 54, the process continues to step 58 to enable the external or internal graphics device. At step 60, the visual information is read from the display cache and verified against the copy written to the hard disk drive at step 50. At step 62, the saved graphics object state and last good frame are recreated on the enabled graphics device. At step 64 a user dialog is presented with a fifteen second timer to confirm that the enable graphics device is the graphics device preferred by the user. If at step 66 the correct graphics device is enabled, the process continues to step 68 at which the enabled graphics device continues to operate. If at step 66 the user indicates that the enabled graphics device is not preferred or the user fails to confirm the operation of the graphics device, the process returns to step 56 to attempt to enable another graphics device.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to generate visual information for presentation at a display;
    a graphics subsystem operable to receive the visual information from the processor and format the visual information to present visual images at the display;
    a bus interfacing the processor and the graphics subsystem and operable to communicate the visual information;
    an external connector interfaced with the bus and operable to communicate the visual information to an external display device; and
    a graphics state module interfaced with the bus, the graphics state module operable to detect insertion of a cable to the external connector and removal of a cable from the external connector, to periodically store the visual information, to determine a preferred display device upon the insertion or removal of the cable, and to provide the stored visual information for presentation at the preferred display devices;
    wherein the graphics state module is further operable to confirm the preferred display device by presenting a user interface at the preferred display device and to present the stored visual information at a second display device a predetermined time after presenting the user interface at the preferred display device if an end user fails to confirm the preferred display device.

2. The information handling system of claim 1 wherein the external display device comprises an external graphics box.

3. The information handling system of claim 1 wherein the bus comprises a PCI Express bus.

4. The information handling system of claim 1 wherein the graphics state module comprises a graphics state memory operable to store display objects having visual information to reconstruct a complete display frame.

5. The information handling system of claim 4 wherein graphics state memory stores the display objects associated with a complete display frame at a predetermined interval of display frames presented at a display.

6. The information handling system of claim 1 further comprising:
    a display cache associated with the graphics state module and operable to store the visual information; and
    a hard disk drive operable to store information, the graphics state module further operable to transfer the visual information from the display cache to the hard disk drive upon the insertion or removal of the cable.

7. The information handling system of claim 6 wherein the graphics state module is further operable to compare the visual information in the display cache and the hard disk drive before providing the stored visual information to the preferred display device.

8. A method for hot insertion and removal of an external graphics device to an information handling system, the method comprising:
    periodically saving visual information generated for communication to graphics devices associated with the information handling system;
    monitoring an external graphics port of the information handling system to detect a change in the connection state of the external graphics device;
    attempting to enable the graphics devices in a predetermined order;
    determining that a graphics device is enabled;
    providing the saved visual information to the enabled graphics device for presentation;
    presenting a user interface at the graphics device to confirm presentation of the visual information;
    continuing to enable the graphics device if a confirmation is received; and
    attempting to enable the graphics device next in the predetermined order if no confirmation is received within a predetermined time.

9. The method of claim 8 wherein periodically saving visual information comprises saving display objects operable to reconstruct a display frame presented at the graphics device.

10. The method of claim 9 wherein periodically saving visual information further comprises saving every fifteenth display frame.

11. The method of claim 8 further comprising:
    copying the saved visual information to a hard disk drive if a change in the connection state is detected; and
    comparing the saved visual information with visual information copied to the hard disk drive before providing the visual information to the enabled graphics device.

12. The method of claim 8 wherein attempting to enable the graphics devices in a predetermined order further comprises attempting to enable an external graphics box before an integrated graphics subsystem.

13. The method of claim 8 wherein the external graphics port comprises a PCI Express graphics port.

14. A system for managing hot connection and disconnection of an external graphics device to an information handling system external graphics port, the system comprising:
    a poller operable to periodically poll the external graphics port to detect a change in a connection state of the graphics device;
    a graphics state memory operable to periodically store visual information generated by the information handling system; and
    a graphics preference module interfaced with the poller and the graphics state memory, the graphics preference module operable to attempt to initialize graphics devices associated with the information handling system in a predetermined order upon detection of the change in the connection state and to provide the visual information to an initialized graphics devices;
    wherein the graphics preference module is further operable to present a confirmation interface at the initialized graphics device for up to a predetermined time and to continue initializing the graphics devices if an input is not detected in the predetermined time.

15. The system of claim 14 wherein the information handling system external graphics port comprises a PCI Express port.

16. The system of claim 14 wherein the change in the connection state comprises an external graphics device connected to the external graphics port and the predetermined order comprises the external graphics device followed by a graphics device integrated with the information handling system.

* * * * *